(12) United States Patent
Eckerle et al.

(10) Patent No.: US 6,732,703 B2
(45) Date of Patent: May 11, 2004

(54) INTERNAL COMBUSTION ENGINE PRODUCING LOW EMISSIONS

(75) Inventors: Wayne A. Eckerle, Columbus, IN (US); Donald W. Stanton, Columbus, IN (US); Francois Ntone, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 10/166,051

(22) Filed: Jun. 11, 2002

(65) Prior Publication Data

US 2003/0226538 A1 Dec. 11, 2003

(51) Int. Cl.[7] .............................. F02B 3/06; F02B 31/00
(52) U.S. Cl. ........................ 123/298; 123/299; 123/301
(58) Field of Search .............................. 123/193.6, 276, 123/294, 298, 299, 301

(56) References Cited

U.S. PATENT DOCUMENTS

| | | |
|---|---|---|
| 1,865,841 A | 7/1932 | Cummins |
| 2,709,992 A * | 6/1955 | Graves ........................ 123/276 |
| 3,020,900 A | 2/1962 | Hoffmann |
| 3,508,531 A | 4/1970 | Squinto et al. |

(List continued on next page.)

FOREIGN PATENT DOCUMENTS

| | | |
|---|---|---|
| DD | 1588 06 | 2/1983 |
| DE | M 17120 Ia/46a | 8/1956 |
| DE | 1 301 657 | 5/1969 |
| EP | 0 071 994 A1 | 2/1983 |
| EP | 0 589 178 A1 | 3/1994 |
| FR | 1217467 | 5/1960 |
| GB | 465565 | 5/1937 |
| GB | 713637 | 8/1954 |
| GB | 2 075 147 A | 11/1981 |
| GB | 2 079 851 A | 1/1982 |
| JP | 51-113007 | 10/1976 |
| JP | 55-90 | 1/1980 |
| JP | 59-134322 A | 8/1984 |
| JP | 59-155551 A | 9/1984 |
| JP | 60-17223 A | 1/1985 |
| JP | 60-32929 A | 2/1985 |
| JP | 60-135651 A | 7/1985 |
| JP | 3-149315 | 6/1991 |
| JP | 4-31651 A | 2/1992 |
| SU | 1107870 A | 3/1984 |

OTHER PUBLICATIONS

Patent Abstracts of Japan, JP 56–106022 (Hino Motors Ltd.), Aug. 24, 1981.

(List continued on next page.)

Primary Examiner—Tony M. Argenbright
(74) Attorney, Agent, or Firm—Nixon Peabody LLP; Tim L. Brackett, Jr.

(57) ABSTRACT

An engine is provided which includes various precise configuration parameters, including dimensions, shape and/or relative positioning of the combustion chamber features, resulting in a combustion process minimizing NOx emissions and particulates. The combustion chamber includes a spray angle relative to an inner bowl floor angle that maximizes the amount of fuel in contact with the inner bowl, in combination with one or more of the following: a vertical distance from the tip of the piston bowl to the injection orifices; a number of injection orifices; a swirl ratio; a vertical distance from the injection orifices to an inner face of the cylinder head; a distance from the piston top surface to the cylinder head; a radius of curvature of an outer bowl section; a radius of curvature at an edge of the piston bowl; a ratio of the piston bowl diameter to the cylinder diameter; and the cylinder diameter.

61 Claims, 4 Drawing Sheets

U.S. PATENT DOCUMENTS

| | | | |
|---|---|---|---|
| 3,805,677 A | 4/1974 | Clary et al. |
| 4,056,044 A | 11/1977 | Kamman et al. |
| 4,161,165 A | 7/1979 | Belush et al. |
| 4,180,027 A | 12/1979 | Taylor |
| 4,242,948 A | 1/1981 | Stang et al. |
| 4,286,505 A | 9/1981 | Amdall |
| 4,377,967 A | 3/1983 | Pelizzoni |
| 4,531,502 A | 7/1985 | Mizuhara |
| 4,662,319 A | 5/1987 | Ayoul |
| 4,759,323 A | 7/1988 | August |
| 4,781,159 A | 11/1988 | Elsbett et al. |
| 4,909,132 A | 3/1990 | Kling et al. |
| 4,989,559 A | 2/1991 | Fletcher-Jones |
| 5,000,144 A | 3/1991 | Schweinzer et al. |
| 5,020,485 A | 6/1991 | Watanabe |
| 5,029,563 A | 7/1991 | Hu |
| 5,040,454 A | 8/1991 | Ballheimer et al. |
| 5,099,809 A | 3/1992 | Kawatani et al. |
| 5,121,722 A | 6/1992 | Horiuchi |
| 5,215,052 A | 6/1993 | Augustin |
| 5,299,738 A | 4/1994 | Genter et al. |
| 5,305,720 A | 4/1994 | Ando et al. |
| 5,320,075 A | 6/1994 | Regueiro |
| 5,322,042 A | 6/1994 | di Priolo et al. |
| 5,363,820 A | 11/1994 | Neitz |
| 5,373,820 A | 12/1994 | Sakamoto et al. |
| 5,445,323 A | 8/1995 | Perr et al. |
| 5,555,867 A | 9/1996 | Freen |
| 5,692,468 A | 12/1997 | Haman et al. |
| 5,868,112 A * | 2/1999 | Makahul et al. ............. 123/263 |
| 5,927,244 A | 7/1999 | Yamauchi et al. |
| 5,983,853 A | 11/1999 | Roessler et al. |
| 6,161,518 A | 12/2000 | Nakakita et al. |
| 2002/0000216 A1 | 1/2002 | Ismailov |

OTHER PUBLICATIONS

Patent Abstracts of Japan, JP 06–346736 (Isuzu Motors Ltd.), Dec. 20, 1994.

D. A. Pierpont and R. D. Reitz, "Effects of Injection Pressure and Nozzle Geometry on D.I. Diesel Emissions and Performance", SAE Technical Paper No. 950604, International Congress and Exposition, Detroit, Mi., Feb. 27–Mar. 2, 1998.

C. G. A. Rosen, "Future Developments in Commercial Vehicle Engines", Automotive Industries, Oct. 15, 1952, pp. 38–42 and 100–104.

* cited by examiner

INTERNAL COMBUSTION ENGINE PRODUCING LOW EMISSIONS

BACKGROUND OF THE INVENTION

1. Technical Field

The invention relates to an improved engine capable of minimizing emissions.

2. Description of Related Art

Internal combustion engine designers continue to confront an ever more demanding set of governmentally mandated emissions standards and performance objectives. Modifications made to meet one standard may lead to increased emissions of a type that cause another standard to be exceeded. Thus designers are often confronted with not only the challenge of meeting a newly imposed emission standard but to do so in a way that does not cause other emissions standards, previously met or newly imposed, to be exceeded. The engine designers must also necessarily consider and preferably minimize the adverse effects of modifications on engine performance and fuel economy.

An example of the difficulties created for engine designers is that created by a new set of diesel engine emissions standards/limits mandated by the Environmental Protection Agency for application in the U.S. market. These standards require diesel engines to produce extremely low levels of emissions below specific limits based upon fuel consumption. Specifically, for example, new on-highway regulations require diesel engines complying with the regulations to maintain nitrogen oxide (NOx) emissions combined with unburned hydrocarbons below 2.5 grams/b-hp-hr and particulates below 0.1 grams/b-hp-hr.

Changes in any one of a variety of engine design variables or engine operating variables such as engine compression; combustion chamber shape; rate of combustion chamber heat rejection and/or fuel injection spray pattern, pressure, timing and/or flow rate may be used to positively affect the control of one or more emissions. However, such changes can often adversely affect one or more other emissions possibly causing the emissions to exceed the acceptable limit. For example, as the brake mean effective pressure (bmep) is desirably increased, a tendency arises for NOx emissions in the engine's exhaust to increase. This problem is accentuated by the need to achieve other critical engine operating characteristics such as fuel economy, high torque output, low operating costs and/or reduced maintenance. As one example, the amount of soot that is entrained in the engine's lubrication oil can have a profound effect on the cost of operation and the length of service before a major overhaul is required. Soot is very abrasive and can cause high wear if allowed to become entrained in the engine's lubrication oil to any substantial degree. The amount of soot entrained in the engine's lubrication oil can be affected by a number of factors such as combustion chamber shape and fuel injection spray angle but changes in these variables can have the undesired effect of actually increasing emissions entrained in the engine's lubrication oil.

Many attempts have been made to produce an ideal flow pattern for the charge air and fuel within the combustion chamber of an internal combustion chamber. For example, provision of a combustion bowl in the upper region of a piston to cause, among other things, fuel/charge air mixture within a direct injection engine is well known as disclosed the article entitled "Future Developments . . .", Automotive Industries, Oct. 15, 1952. While most of the combustion bowl designs disclosed in this article appear to be symmetric about a central axis, the article does not address the critical relationship of the combustion bowl shape and the fuel injection path, nor other combustion chamber features, on the specific problems addressed by the subject invention.

A variety of piston designs have been disclosed including symmetrical bowl shaped recesses formed in the upper surface of the piston crown to achieve desired flow patterns within the combustion chamber formed in part by the piston. These bowl configurations are often referred to as "Mexican-hat" designs. For example, U.S. Pat. No. 4,377,967 discloses an articulated piston assembly including a crown containing a symmetrical combustion bowl in the top surface defined by a cone shaped central floor section which connects at its base to an arcuate surface of revolution coaxial with the central axis of the cone surface wherein the surface of revolution flares upwardly to join with the uppermost surface of the piston. The base of the cone shaped central floor section extends over no more than approximately 50% of the diameter of the bowl. Other similar piston designs are disclosed in U.K. Patent Application No. 2,075,147; and U.S. Pat. Nos. 1,865,841; 3,508,531; 4,242,948 and 5,029,563. However, none of these references disclose any critical size ranges or ratios for the disclosed combustion bowl and chamber designs, suggest the importance of the angle of the fuel spray from the spray orifices in relationship to the combustion bowl shape and specific distances between the piston and both the cylinder head and spray orifices. Thus, these patents fail to disclose that the combustion chamber and piston bowl have crucial dimensions and dimensional relationships that are required to achieve specific engine functionalities including low emissions.

U.S. Pat. No. 5,868,112, assigned to the assignee of the present invention, discloses a piston having a crown containing a combustion bowl shaped to complement the injection fuel spray plume in a manner to maintain very low entrainment of soot in the lubrication oil of the engine and to maintain other engine emissions within acceptable ranges. However, this patent does not appreciate the specific combination of features and dimensions necessary to produce both NOx and particulates below the new regulated limits.

Despite the many examples of combustion chamber arrangements, including piston designs, contained in the prior art, the prior art does not appear to suggest an arrangement that creates the appropriate cooperation between the piston and an injector spray plume to minimize NOx emissions while effectively promoting the oxidation of particulates during combustion by controlling and directing combustion gases in a manner to achieve acceptably low exhaust emissions relative to the new regulated limits. A need, thus, exists for an engine and combustion chamber arrangement that is capable of achieving this combination of functionality.

SUMMARY OF THE INVENTION

It is, therefore, one object of the present invention to overcome the deficiencies of the prior art and to provide an internal combustion engine containing a combustion chamber arrangement designed to reduce undesirable engine emissions sufficiently to meet new regulated limits.

Another object of the invention is to provide a combustion chamber arrangement which reduces undesirable engine emissions sufficiently to meet new regulated limits while also minimizing soot in the engine lubrication oil and maintaining other engine performance requirements, such as fuel economy, at acceptable levels.

Another object of the present invention is to provide an engine wherein the shape, position and dimensions of various features of the combustion chamber arrangement, including the piston bowl and the injection spray angle, cause the spray plume to impinge upon and contact the piston bowl surface soon, and much sooner than conventional arrangements, after exiting the injector orifices.

Still another object of the present invention is to provide a diesel engine capable of meeting the new NOx and particulate emission regulations while maintaining acceptable fuel consumption and lube oil soot contamination.

Another object of the present invention is to provide a diesel engine capable of operating below 2.5 grams/b-hp-hr of NOx emissions plus unburned hydrocarbons and below 0.1 grams/b-hp-hr of particulates while also satisfying mechanical design constraints for a commercially acceptable engine.

A more specific object of the subject invention is to provide an engine including a combustion chamber arrangement having dimensions and dimensional relationships to minimize the amount of fuel exposed to oxygen in the chamber during the initial portion of the injection to minimize NOx emissions while ensuring oxidation of sufficient particulates during combustion to minimize both particulates available for entrainment in the engine's lubrication oil and particulates available for discharge to the exhaust system.

A still more specific object of the subject invention is to provide a key combination of combustion chamber design parameters that together result in a combustion recipe that produces lower NOx emissions than conventional engines.

According to the invention, the above objects and other more detailed objects may be achieved by providing an engine with a combustion chamber arrangement having certain predetermined combinations of combustion chamber design parameters, including specific combustion chamber dimensions and dimensional relationships. For example, in the preferred embodiment, the engine includes an engine body including an engine cylinder, a cylinder head forming an inner face of the combustion chamber and at least one intake port formed in the cylinder head for directing intake air into the combustion chamber. The intake air undergoes a swirling effect during operation to form a swirl ratio in the range of 0.5–2.5. The engine also includes a piston positioned for reciprocal movement in the engine cylinder between a bottom dead center position and a top dead center position. The piston includes a piston crown including a top face facing the combustion chamber. The piston crown contains a piston bowl formed by an outwardly opening cavity while the piston bowl includes a projecting portion having a distal end and an inner bowl floor section extending inwardly at an inner bowl floor angle $\alpha$ in the range of 16–40 degrees from a plane perpendicular to an axis of reciprocation of the piston. The piston bowl further includes an outwardly flared outer bowl section having a concave curvilinear shape and cross section. The engine further includes an injector mounted on the engine body adjacent the projecting portion of the piston bowl to inject fuel into the combustion chamber. The injector includes a plurality of orifices arranged to form a spray plume. Each of the plurality of orifices includes a central axis oriented at a spray angle $\alpha$ from a plane perpendicular to the axis of the reciprocation of the piston sufficient to cause the spray plume to impinge on the inner bowl floor section. The spray angle $\beta$ is equal to a value causing the spray angle $\beta$ minus the inner bowl floor angle $\alpha$ to be in the range of 0– degrees. Each of the plurality of orifices includes an outlet opening having a center wherein the center is a distance $L_1$ from the distal end of the projecting portion and is in the range of 0.5–4 mm.

The plurality of orifices are preferably no more than six orifices and even more preferably less than six orifices. Also, the inner bowl floor angle $\alpha$ is preferably in the range of 18–30 degrees while the spray angle $\beta$ equals a value causing the spray angle $\beta$ minus the inner bowl floor angle $\alpha$ to be in the range of 0–13 degrees. Preferably the swirl ratio is in the range of 0.7–1.5. The engine may also include a cylinder head forming an inner face of the combustion chamber wherein a distance $L_2$ between the center of the outlet opening and the inner face of the cylinder head is in the range of −0.5–3 mm. The combustion chamber may be designed such that a distance BH between the top face of the piston crown and the center of the outlet opening is in the range of 0.5–8 mm. Also, the concave curvilinear shape of the outwardly flared outer bowl section may include a radius of curvature R1 in the range of 8–20 mm. The engine cylinder may include a cylinder diameter CD and the piston bowl may include a bowl diameter BD wherein a BD/CD ratio is in the range of 0.5–0.9. The outwardly flared outer bowl section may intersect the top face at an edge having a radius of curvature R2 equal to or less than 1.5 mm. Preferably, the distance $L_1$ is in the range of 1.5–3 mm.

Various other specific combinations of the combustion chamber design parameters described above are also taught by the present invention to achieve the objectives stated herein. For example, an engine having a swirl ratio in the range of 0.5–2.5, an inner bowl floor angle $\alpha$ in the range of 16–40 degrees, a radius of curvature $R_1$ in the range of 8–20 mm, the spray angle $\beta$ equal to a value causing the spray angle $\beta$ minus the inner bowl floor angle $\alpha$ to be in the range of 0–19 degrees, and the distance $L_2$ in the range of −0.5–3 mm is also within the teaching of the present invention. Likewise, the specific combinations of swirl ratio, spray angle, inner bowl floor angle, radius of curvature $R_1$ and radius of curvature $R_2$, also form a combustion chamber in accordance with the present invention. In addition, the present invention is directed to an engine body containing the specific combination of design parameters including swirl ratio, inner bowl floor angle, spray angle and a plurality of injection orifices less than six. One or more of the objects of the present invention are also achieved by the particular combination of the swirl ratio taught herein, the inner bowl floor angle, the spray angle, the distance $L_2$ and the distance BH. Furthermore, one or more objectives of the present invention also achieve by the combination of the inner bowl floor angle, the spray angle, the distance $L_1$, the distance $L_2$ and the distance BH. Furthermore, one or more objects of the present invention are also achieved by providing an engine with a combustion chamber having the following combination as taught herein: inner bowl floor angle, spray angle, distance $L_1$, distance $L_2$, and $R_1$. Also, the present invention achieves one or more objects by providing an engine having the combination of design parameters as taught herein including the inner bowl floor angle, the spray angle, the radius of curvature $R_2$, the distance $L_1$ and the distance BH. Of course, other specific combinations of the design parameters taught herein are also deemed to be within the scope of the present invention.

DETAILED DESCRIPTION OF THE INVENTION

Figure 1:
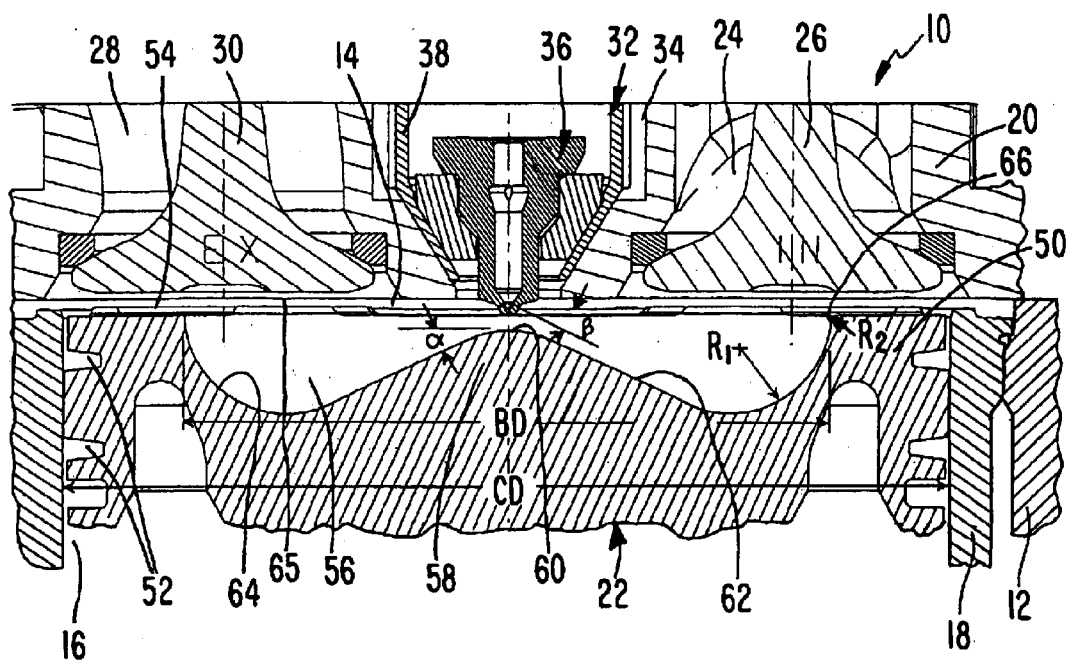
FIG. 1 is a cutaway view of a portion of the internal combustion engine of the present invention employing the combustion chamber arrangement of the present invention with the piston in the top dead center position.

Referring to FIG. 1, the present invention is directed to an internal combustion engine, a portion of which is shown in a cutaway cross sectional view and generally indicated at 10, capable of producing emissions, e.g. NOx and particulates, at levels significantly lower than emissions levels produced by conventional engines and below recent government regulated limits. As discussed hereinbelow, engine 10 includes various precise configuration parameters resulting in a combustion process which achieves desired combustion characteristics for producing acceptably low emissions satisfactory to meet newly adopted engine operating standards applicable to diesel engines including both low noxious emissions and low particulates, while achieving desirable fuel economy and efficiency.

Engine 10 includes an engine block, only a small portion of which is illustrated at 12, and at least one combustion chamber 14. Of course, the engine may contain a plurality of combustion chambers, typically four to eight, which may be arranged in a line or in a "V" configuration. Each combustion chamber is formed at one end of a cylinder cavity 16 which may be formed directly in engine block 12. The cylinder cavity 16 may be arranged to receive a removable cylinder liner 18 which is only partially shown in FIG. 1. As is also common, one end of the cylinder cavity is closed by an engine cylinder head 20. The engine 10 further includes a respective piston 22 mounted in a corresponding liner 18 associated with each combustion chamber. Although only a top portion of piston 22 is shown in FIG. 1, piston 22 may be any type of piston so long as it contains the features identified hereinbelow necessary for accomplishing the present invention. For example, piston 22 may be an articulated piston or a single piece piston design. The upper surface or top face of piston 22 cooperates with head 20 and the portion of cylinder liner 18 extending between head 20 and piston 22 to define combustion chamber 14. Although not specifically illustrated, piston 22 is connected through a connecting rod to a crankshaft of the internal combustion engine which causes the piston to reciprocate along a rectilinear path within cylinder liner 18 as the engine crankshaft rotates. FIG. 1 illustrates the position of piston 22 in a top dead center (TDC) position achieved when the crankshaft is positioned to move the piston to the furthest most position away from the rotational axis of the crankshaft. In the conventional manner, the piston moves from the top dead center position to a bottom dead center (BDC) position when advancing through intake and power strokes. For purposes of this disclosure, the words "outward" and "outwardly" correspond to the direction away from the engine crankshaft and the words "inward" and "inwardly" correspond to the direction toward the crankshaft of the engine or bottom dead center position of the piston.

Engine 10 of the present invention is a four-cycle compression ignition (diesel) engine employing direct injection of fuel into each combustion chamber of the engine. An intake passage 24 selectively directs intake air into combustion chamber 14 by means of a pair of poppet valves 26, only one of which is illustrated in FIG. 1. Similarly, an exhaust passage 28 selectively directs exhaust gas from combustion chamber 14 by means of a pair of exhaust poppet valves 30, only one of which is illustrated in FIG. 1. The opening and closing of valves 26 and 30 may be achieved by a mechanical cam or hydraulic actuation system or other motive system in carefully controlled time sequence with the reciprocal movement of piston 22.

At the uppermost, TDC position shown in FIG. 1, piston 22 has just completed its upward compression stroke during which the charge air allowed to enter the combustion chamber 16 from intake passage 24 is compressed thereby raising its temperature above the ignition temperature of the engine's fuel. This position is usually considered the zero position commencing the 720 degrees of rotation required to complete four strokes of piston 22. The amount of charge air that is caused to enter the combustion chambers may be increased by providing a pressure boost in the engine's intake manifold. This pressure boost may be provided, for example, by a turbocharger, not illustrated, driven by a turbine powered by the engine's exhaust, or maybe driven by the engine's crankshaft.

Engine 10 also includes an injector 32 securely mounted in an injector bore 34 for injecting fuel at very high pressure into combustion chamber 14 when piston 22 is approaching, at or moving away from, the TDC position. Injector 32 includes, at its inner end, an injector nozzle assembly 36 which is held to the remainder of the injector assembly, not illustrated, by a means of a nozzle retainer 38. Injector 32 includes a plurality of small injection orifices 40, formed in the lower end of nozzle assembly 36 for permitting the high pressure fuel to flow from the nozzle cavity of injector 32 into the combustion chamber at a very high pressure to induce thorough mixing of the fuel with the high temperature, compressed charge air within combustion chamber 14. It should be understood that injector 32 may be any type of injector capable of injecting high pressure fuel through a plurality of injector orifices into combustion chamber 14 in the manner described hereinbelow with respect to the spray angle of the fuel. For example, injector 32 may be a closed nozzle injector or an open nozzle injector. Moreover, injector 32 may include a mechanically actuated plunger housed within the injector body for creating the high pressure during an advancement stroke of the plunger assembly. Alternatively, the injector 32 may receive high pressure fuel from an upstream high pressure source such as in a pump-line-nozzle system including one or more high pressure pumps and/or a high pressure accumulator and/or a fuel distributor. The injector 32 may include an electronically actuated injection control valve which supplies high pressure fuel to the nozzle valve assembly to open the nozzle valve element, or controls the draining of high pressure fuel from the nozzle valve cavity to create a pressure imbalance on the nozzle valve element thereby causing the nozzle valve element to open and close to form an injection event. For example, the nozzle valve element 36 may be a conventional spring-biased closed nozzle valve element actuated by fuel pressure, such as disclosed in U.S. Pat. No. 5,326,034, the entire contents of which is hereby incorporated by reference. The injector 32 may be in the form of the injector disclosed in U.S. Pat. No. 5,819,704, the entire contents of which is hereby incorporated by reference.

The engine of the present invention includes combustion chamber components and features sized, shaped and/or positioned relative to one another, as described hereinbelow, to advantageously reduce both NOx emissions and particulates to levels at or below new regulatory standards while maintaining acceptable fuel economy. Specifically, the dimensions, shape and/or relative positioning of the combustion chamber components and features reduce the exposure of the fuel to oxygen in combustion chamber 14 during the initial portion of an injection event thereby reducing NOx emissions while ensuring sufficient oxidation of particulate matter later in the combustion event and minimizing interaction between the combustion gases and the cylinder walls. The dimensions, shape and/or relative positioning of the combustion chamber components and features as described hereinbelow results in a combustion chamber capable of forming, directing, controlling and creating a pattern of injected fuel and gaseous flow within the combustion chamber 14 during both the initial stages of fuel injection and during the initiation of combustion and expansion of the resulting gases during the power stroke of piston 22 so as to achieve optimum emission reductions.

Figure 2:
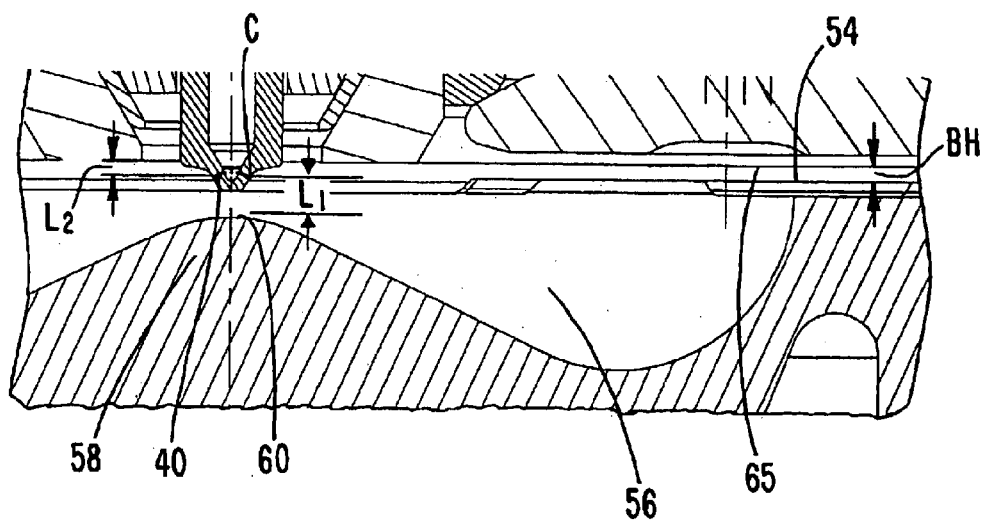
FIG. 2 is an enlarged view of a portion of FIG. 1 showing various dimensions.

To understand the unique physical characteristics of combustion chamber 14, attention is initially directed to FIGS. 1 and 2 illustrating the various physical characteristics or parameters, at least two, and preferably all, of which are required to achieve the unexpected emission reduction advantages of the present invention. While the general shape of the combustion chamber has antecedence in the prior art, it is the specific configuration, and more importantly, the critical dimensions and dimensional relationships described hereinbelow which result in the improved functional performance of the present invention. More particularly, the upper portion of piston 22 may be referred to as the piston crown 50. This area of the piston includes a depending cylindrical wall having a plurality of outwardly opening, annular grooves 52 for receiving corresponding piston rings designed to form a relatively tight combustion gas seal between the piston and the surrounding walls of cylinder liner 18. Piston crown 50 includes a top face 54 partially forming combustion chamber 14 and a piston bowl 56 formed by an outwardly opening cavity. Piston bowl 56 includes a projecting portion 58 preferably positioned at or near the center of bowl 56. Projecting portion 58 includes a distal end 60 positioned, in the preferred embodiment shown in FIG. 1, at the center of piston bowl 56 and thus positioned along the axis of reciprocation of piston 22. Projecting portion 58 also includes an inner bowl floor section 62 extending from projecting portion 58 inwardly (toward the BDC position of piston 22) at an inner bowl floor angle α in the range of 16–40 degrees from a plane perpendicular to an axis of reciprocation of piston 22 as shown in FIG. 1. As will be explained hereinbelow, the inner bowl floor angle α is designed to be relatively steep and also designed relative to a spray angle β so as to cause desirable interaction between a fuel spray pattern or plume 63 (FIG. 3a) and piston bowl 56 necessary for optimized engine emissions reductions. Preferably, a more specific and desirable range for inner bowl floor angle α would be between 18 and 30 degrees.

Piston bowl 56 also includes an outwardly flared outer bowl section 64 having a generally concave curvilinear shape in diametric cross section. Outer bowl section 64 effectively shapes and directs the flow of fuel and the fuel/air mixture within the combustion chamber. Outer bowl section 64 is designed with a particular radius $R_1$ and a particular location for a center of radius $CR_1$ so as to ensure the spray plume interacts with an inner face 65 of cylinder head 20 in an appropriate manner to ensure proper mixing and burning without interaction with the walls of cylinder liner 18. Specifically, $R_1$ may range between 8 and 20 mm, and preferably within the range of 12–16.5 mm. For each of the dimensional ranges provided herein, a value within the higher end of the range will likely be more appropriate for larger engines having larger piston diameters and a value falling within the lower end of the range will more likely to be more desirable for smaller engines having smaller diameter pistons. Also, the location of the center of radius $CR_1$, for $R_1$ is preferably positioned on a plane extending through top face 54 of piston 22, or within piston bowl 56, and thus it is less desirable for $R_1$ to be positioned above top face 54 shown in FIG. 1. By combining the magnitude of $R_1$ and the location of $CR_1$ as described herein, the present invention creates outer bowl section 64 with an outward flare capable of controlling the momentum of spray plume 63 as it follows outer bowl section 64 to optimize combustion. An important objective of the subject invention is to minimize the amount of soot which actually reaches and becomes entrained in the lubrication film formed on the cylinder walls of liner 18 by promoting efficient combustion of the fuel within combustion chamber 14 while creating and constraining the flow of gases within the combustion chamber 14 to further minimize the possibility of soot entrainment within the film by ensuring the complete burning/oxidation of the particulates formed during the combustion process. Specifically, the position of $CR_1$ and the magnitude of $R_1$ ensures that the spray plume and fuel/air mixture rolling off the upper edge 66 of bowl 56 has sufficient momentum to be directed into cylinder head 20 resulting in the proper degree of mixing and oxidation of particulates. Outer bowl section 64 is specifically designed to prevent inadequate momentum of the spray plume and fuel/air mixture which would cause undesirable stagnation of the plume and air fuel mixture without interaction with the cylinder head thereby resulting in inadequate mixing and burning of particulates. This is achieved by having an $R_1$ that is sufficiently large resulting in a curvature in outer bowl section 64 to create and maintain the momentum in the spray plume and fuel/air mixture. Outer bowl section 64 is also designed to prevent excessive momentum in the spray plume and fuel/air mixture which would cause the spray plume and fuel/air mixture to interact with the cylinder head with an excessive velocity causing the spray plume/fuel/air mixture to impact cylinder head 20 and spread or rebound toward the cylinder walls formed by cylinder liner 18. The fuel interacting with the lube oil film on the cylinder walls of combustion chamber 14 causes the unburned particulates in the fuel/air mixture to become entrained within the lubrication film resulting in soot which eventually works its way below the piston rings where it may become intermixed with the engine lubrication oil. The amount of fuel and particulates interacting with oil on the cylinder wall is at least partially minimized by using an $R_1$ that is sufficiently small to create a curvature which avoids excessive momentum in the spray plume and fuel/air mixture. Thus, $R_1$ is designed to modulate the momentum of the combustion plume to ensure the plume has sufficient momentum to interact with the cylinder head and reflect back into the open space of the combustion chamber 14. Decreasing $R_1$ tends to decrease the momentum of the combustion plume.

The upper surface of outer bowl section 64 adjacent edge 66 preferably extends vertically parallel to the axis of the piston, or slightly inward toward the axis of reciprocation of piston 22. That is, if this upper surface of outer bowl section 64 at edge 66 has a center of radius $CR_1$, then $CR_1$ is preferably positioned on a plane extending through top face 54 or positioned with bowl 56. The curvilinear shape of outer bowl section 64 may be formed by a surface having a radius of curvature $R_1$ which terminates before edge 66 while a vertical upper portion of outer bowl section 64 extends tangentially from the surface having a radius of curvature $R_1$, vertically to edge 66. Preferably, as noted above, $CR_1$ is not positioned above top face 54, and preferably the upper portion of outer bowl section 64 adjacent edge 66 does not intersect edge 66 in a manner which directs gases outwardly toward the cylinder walls formed by cylinder liner 18. In this manner, proper control of the spray plume and fuel/air mixture and control of the interaction with the cylinder head is enhanced while preventing interaction with the cylinder walls thereby minimizing emissions and reducing soot.

Figure 3A:
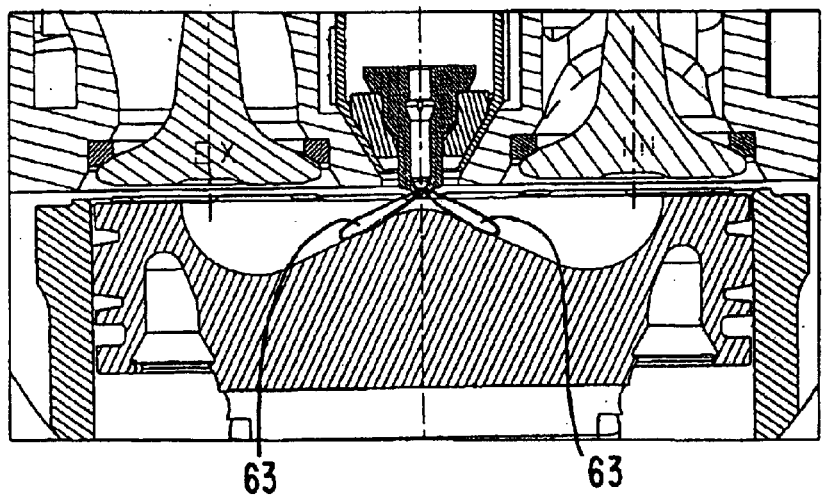
FIGS. 3a–3c are cutaway cross sectional views similar to FIG. 1 showing sequentially the progress of the spray plume during an injection event as the piston moves from the top dead center position toward the bottom dead center position.
Figure 3B:
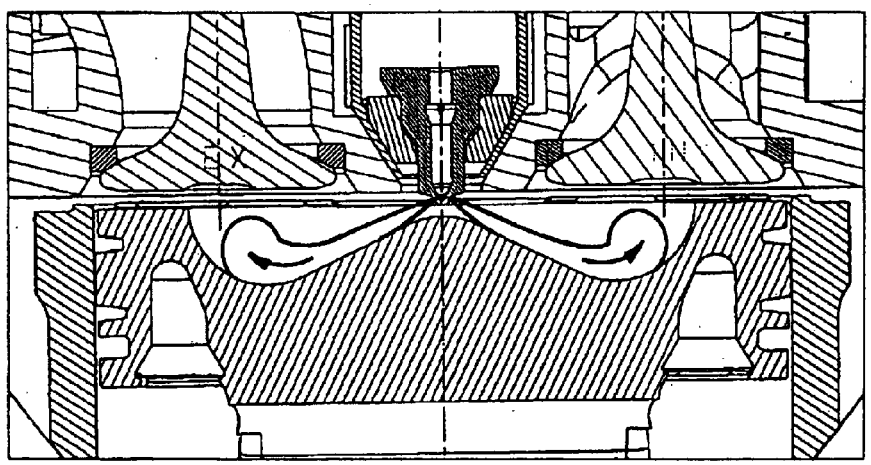
Figure 3C:
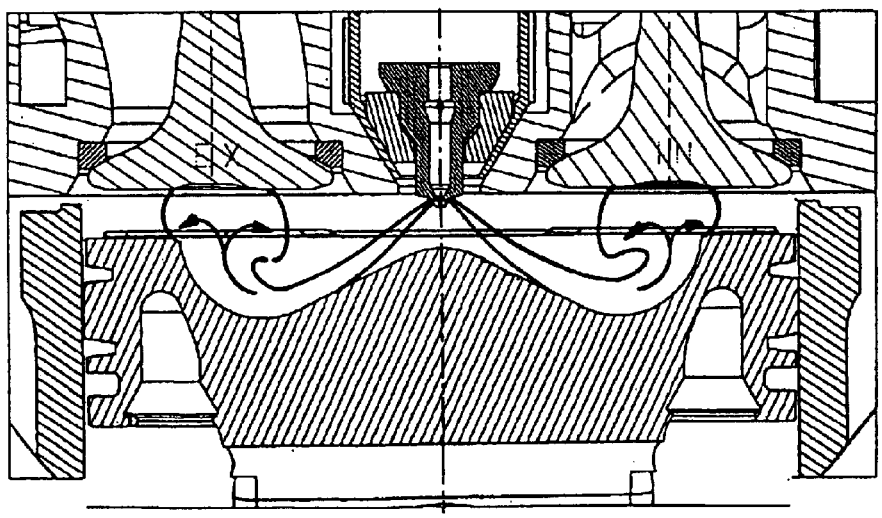
Figure 4:
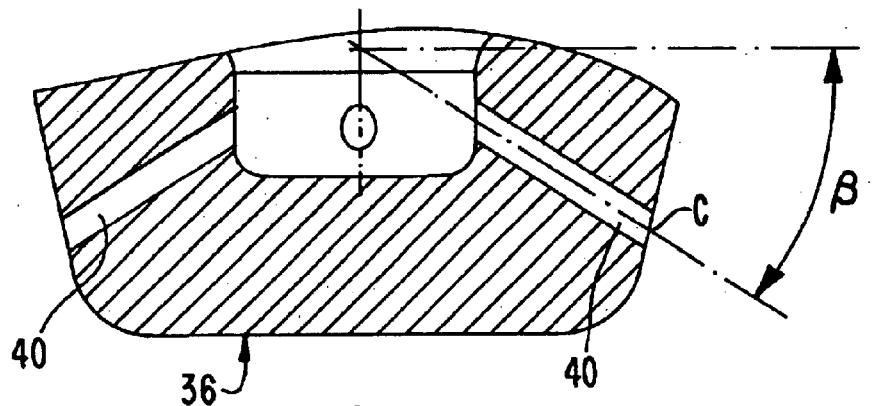
FIG. 4 is an enlarged cutaway, cross sectional view taken through the end of the injector nozzle assembly of FIG. 1 which contains the injection orifices.
Figure 5:
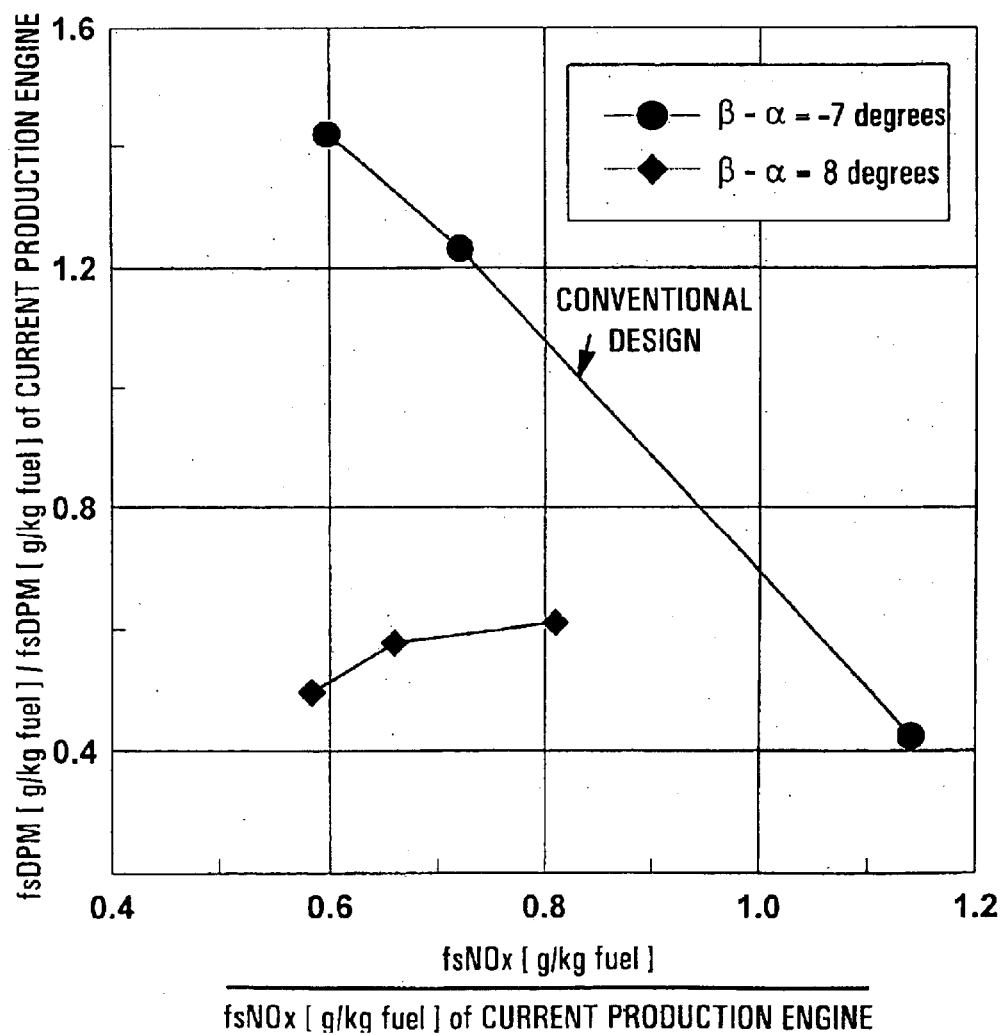
FIG. 5 is a graph illustrating normalize data showing the emissions results of the present invention relative to emissions levels of current production engines.

As shown in FIG. 3, spray or injection orifices 40 of injector 32 extend through the injector nozzle 36 to deliver fuel to combustion chamber 14. An important aspect of the subject invention involves orienting the central axis of each orifice 40 in a relatively steep spray angle β measured between a plane perpendicular to the axis of reciprocation of the piston and a central axis of each spray orifice 40 (FIGS. 1 and 4). Therefore, β is the angle of spray emanating from fuel injection orifices 40. Spray angle β may be equal to a value causing the spray angle p minus the inner bowl floor angle a to be in the range of 0–19 degrees, but preferably within the range of 1–13 degrees. This dimensional relationship results in the fuel spray plume 63 being directed toward the upper portion of projecting portion 58 near the upper edge of inner bowl floor section 62 as shown in FIG. 3a. Although it is possible that the fuel spray may be directed in a parallel direction along inner bowl floor section 62 under certain conditions where the movement of piston 22 and swirling of the air causes the spray plume to be forced into impingement with inner bowl floor section 62, preferably the central axis of the spray plume 63, which is also the central axis of each spray orifice 40 passing through the center C of each outlet opening 68 (FIG. 4) of each spray orifice 40, is angled slightly toward inner bowl floor section 62 at some angle such as any degree greater than 0 and less than 13 degrees. As a result, spray plume 63 engages projecting portion 58 soon after exiting outlet opening 68 and spreads out over inner bowl floor section 62 of projecting portion 58 as it flows downwardly as shown in FIGS. 3a–3c. By forming α and β such that the dimensional relationship between β and α, i.e. β minus α, causes spray plume 63 to be directed toward the top portion of projecting portion 58, the present invention maximizes the amount of fuel in contact with inner bowl floor section 62 thereby minimizing the exposure of the fuel to oxygen in the combustion chamber 14 during the initial portion of the injection event/combustion. As a result, the formation of NOx and particulate emissions is desirably minimized. FIG. 5 illustrates normalized data showing the emissions results of the present invention at β–α=8 degrees relative to emissions levels of current production engines. FIG. 5 illustrates that key benefit of the present invention in reducing both NOx and particulate emissions, not just one type of emissions.

Figure 6:
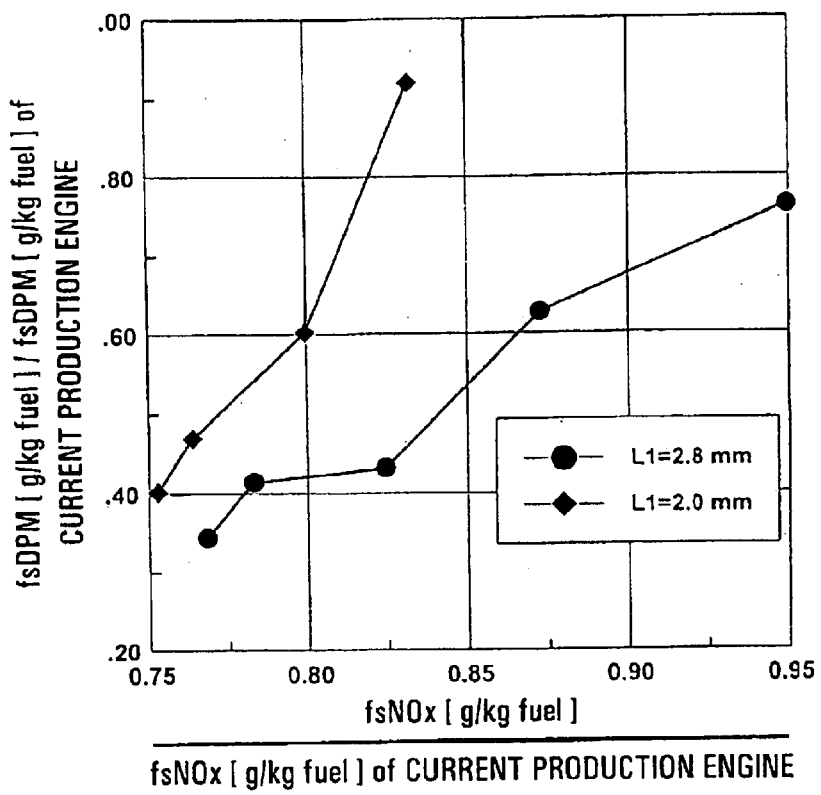
FIG. 6 is a graph illustrating the effects of varying distance $L_1$ with the engine of the present invention.

Another important combustion chamber parameter of the present invention critical to ensuring that fuel spray plume 63 contacts projecting portion 58 quickly and properly interacts with inner bowl floor section 62 is the vertical distance $L_1$ from the distal end 60 of projecting portion 58 to the center C of outlet openings 68 of injection orifices 40 as shown in FIG. 2. The combustion chamber arrangement of the present invention specifically includes the dimension $L_1$ having a magnitude in the range of 0.5–4 mm, and preferably in the range of 1.5–3 mm. An $L_1$ value within this range has been found by applicants to effectively enhance and ensure the interaction of spray plume 63 with inner bowl floor section 62 and minimize the length of the flow path of spray plume 63 between the outlet opening 68 and the impingement point of the spray against inner bowl floor section 62 thereby minimizing the opportunity for oxidation of the fuel and thus minimizing NOx emissions. Also, with each data point representing a different injection timing, a greater distance $L_1$, for the arrangement illustrated in FIG. 1, results in significantly increased NOx emissions and decreased particulates as shown in FIG. 6.

Another important combustion chamber parameter significantly affecting emissions is the number N of injection or spray orifices 40. In accordance with the present invention, no more than six injection orifices are used to deliver fuel to combustion chamber 14. Preferably, less than six injection orifices, such as four or five, are used. The number of injection orifices N is critical for the following reason. One object of the present invention is to minimize NOx emissions by minimizing the exposure of fuel to air in the combustion chamber during the initial portion of the injection event/combustion as the spray plume travels from outlet openings 68 of injection orifices 40 to inner bowl floor section 62. The greater the number of injection orifices, the greater the number of spray plumes flowing through the combustion chamber resulting in a larger surface area of fuel exposed to oxygen in the combustion chamber. Thus, the amount of fuel exposed to oxygen in the combustion chamber can be reduced by reducing the number of injection orifices. However, this reduction in injection orifices must be balanced with the need to promote proper distribution of the fuel within combustion chamber 14 and effective mixing of the fuel and air during the entire combustion process. Although many conventional injectors use more than six injection orifices, applicants have found that preferably no more than six orifices would be used and preferably four or five to minimize the exposure of the fuel to oxygen as it travels toward inner bowl floor section 62 and as it flows across the various surfaces of bowl 56 thereby reducing NOx emissions.

Another important combustion chamber parameter beneficial in controlling emissions is the swirl ratio of the air flow that is generated by the intake ports 24. The swirl ratio SR is a ratio of the tangential velocity of the air spinning around combustion chamber 14 divided by the engine speed. That is, the swirl ratio is a measure of the tangential motion of the air as it enters the engine cylinder from the intake port(s) of the cylinder head. Precisely, the term swirl ratio refers to the average in-cylinder angular velocity of the air at intake valve closing divided by the cylinder piston angular velocity. For example, an engine running at 1800 rpm with a head generating an air motion with a swirl ratio of 2 implies that the air in the cylinder at intake valve closing is rotating with an average angular velocity of 3600 rpm. The higher the swirl ratio, the greater the swirling effect of the air or air fuel mixture, while the lower the swirl ratio, the lower the swirling effect. The swirling effect is a generally tangential motion that upon compression by piston 22 creates turbulence and assists in the combustion process. However, an increased swirling effect or swirl ratio generally tends to increase NOx emissions. The reason for this increase in NOx emissions is that the swirling effect tends to undesirably deflect the plume and cause a decay in the momentum of the combustion plume exiting the piston bowl. As a result, the ability of the plume to exit the piston bowl and desirably interact with the combustion head (FIG. 3c) is disadvantageously impeded possibly causing the plume to remain in the piston bowl thereby hindering complete combustion by preventing maximum exposure to free oxygen. Applicants have found that maintaining a swirl ratio in the range of 0.5–2.5, and preferably within the range of 0.7–1.5, in combination with one or more of the other combustion chamber parameters, maintains the swirling effect at a sufficiently low level to enhance the reduction in NOx emissions while still permitting sufficient turbulence for combustion. By maintaining a swirl ratio within the preferred range, the combustion plume is permitted to advantageously interact with the cylinder head (FIG. 3c) to optimize exposure to free oxygen in the combustion chamber thereby enhancing the reductions in particulates and NOx emissions.

Another combustion chamber parameter which can be set to assist in reducing emissions is the vertical distance $L_2$ from the center C of the outlet openings 68 of injection orifices 40 to the inner face 65 of cylinder head 20 facing combustion chamber 14. That is, $L_2$ represents the distance the injection orifices 40 protrude into the combustion chamber below cylinder head 20. Applicants have found that the range of $L_2$ should preferably be −0.5–3 mm, wherein the negative value of $L_2$ occurs when the center C of the outlet opening 68 is positioned just inside of the bore 34 of cylinder head 20.

Another important combustion chamber parameter is the distance BH from the piston top face 54 to the inner face of cylinder head 20 when piston 22 is in the top dead center position as shown in FIG. 2. Applicants have found that the preferred range for BH is 0.5–8 mm. Of course, the lower end of the BH value is limited by mechanical clearance issues while the important upper limit assists in confining the combustion gases more to the interior of the combustion chamber or piston, i.e. the piston bowl 56. Applicants have found that BH significantly affects the interaction of the combustion plume with the cylinder head. Also, it has been found that a BH outside the preferred range is more likely to increase soot in the lubrication oil on the cylinder walls. BH is especially effective in combination with one or more of the other combustion chamber parameters discussed herein to enhance the reductions in emissions. It should be noted that the top face 54 of piston 22 is considered the outer most surface of the piston and therefore BH is not measured from a recessed surface such as those surfaces formed by valve pockets for providing clearance from open intake and exhaust valves.

Another critical combustion chamber parameter is the radius of curvature $R_2$ at the lip or edge 66 of combustion bowl 56 as shown in FIG. 2. Although the radius $R_2$ is only shown at FIG. 2 at one point along edge 66, it should be understood that $R_2$ is formed along the entire edge 66 around the circumference of piston bowl 56. $R_2$ is preferably in the range of 0.5–1.5 mm. The upper limit of 1.5 mm is important to maintaining the control over the direction of flow of the combustion plume as it flows off of outer bowl section 64. Applicants have found that an $R_2$ having a greater value than approximately 1.5 mm undesirably permits a significant amount of combustion gases to flow toward the cylinder walls of liner 18 thereby undesirably increasing the level of particulates/soot developed in the lube oil film on the cylinder wall. Moreover, a smaller radius $R_2$ at edge 66 permits more control over the direction of flow of the combustion gas in the vertical direction toward cylinder head 20 and thus ensures a continuation of the momentum and desired interaction with the cylinder head, i.e. reflecting back into the free air space of the combustion chamber in a desirable manner. The objective is to form $R_2$ with the smallest radius possible while maintaining the structural integrity of the piston.

Finally, the size of combustion chamber 14 can be adjusted to control emissions. The cylinder bore diameter CD is preferably in the range of 95–140 mm. The precise cylinder bore diameter within this range depends greatly on the desired size and power output of the engine. Similarly, the piston bowl diameter BD shown in FIG. 1 is preferably of a magnitude that causes the ratio of the bowl diameter to the cylinder bore diameter BD/CD to be in the range of 0.5–0.9. Essentially, applicants had found that it is beneficial to form a BD/CD ratio which is as high as the structural limits of the piston permit. Applicants have found that a larger piston bowl diameter BD improves fuel economy by exposing more of the combustion plume to more free oxygen after the initial burn as the plume interacts with the cylinder head (FIG. 3c) resulting in improved combustion. Thus, applicants have found it to be very beneficial to achieve a BD/CD ratio between 0.8–0.9.

Figure 7:
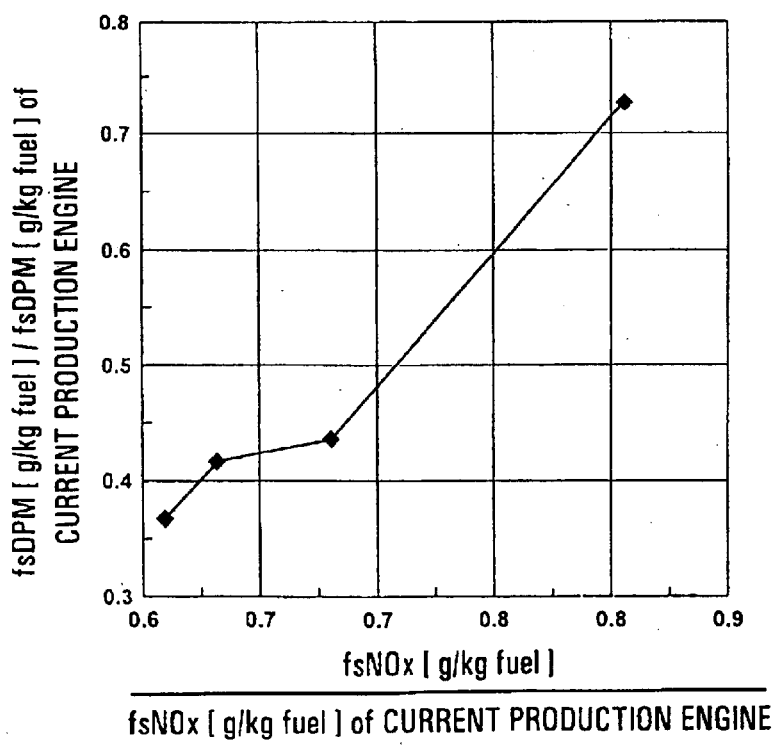
FIG. 7 is a graph illustrating normalized data showing the emissions results of the present engine relative to emissions levels of current production engines.

Combinations of the above described combustion chamber parameters selected within the specified ranges provided advantages in reducing emissions in comparison to conventional engine designs, including specifically meeting new emissions standards relative to NOx emissions and particulates, and also in reducing lube oil contamination by particulates. Combustion chamber 14 specifically includes a spray angle β relative to an inner bowl floor angle α that maximizes the amount of fuel in contact with the inner bowl floor section 62, in combination with one or more of the following dimensions and dimensional relationships hereinabove with respect to: the vertical distance $L_1$ from the distal end 60 of the piston bowl 56 to the center C of the outlet openings 68 of the injection orifices 40; the number N of injection orifices; the swirl ratio SR; the vertical distance $L_2$ from the injection orifices 40 to an inner face 65 of the cylinder head 20; the distance BH from the piston top face 54 to cylinder head 20; the radius of curvature $R_1$ of an outer bowl section 64; a radius of curvature $R_2$ at an edge of piston bowl 56; the ratio BD/CD of the piston bowl diameter to the cylinder diameter; and the cylinder diameter CD. FIG. 7 illustrates normalized data showing the emissions results of the present invention relative to emissions levels of current production engines. For example, the data point farthest to the left on the graph shows that with the right combinations of the engine parameters as discussed hereinabove, diesel particulate matter can be reduced to approximately 36% of the level typically produced by a conventional diesel production engine, while NOx was reduced to approximately 62% of typical conventional diesel engine levels. Thus, the NOx vs DPM tradeoff curve is radically different from a conventional engine in that both the NOx and particulates can be reduced simultaneously to levels within regulated standards.

INDUSTRIAL APPLICABILITY

It is understood that the present invention is applicable to all reciprocating piston internal combustion engines. This invention is particularly applicable to diesel engines and specifically heavy duty diesel engines, used in truck and automotive vehicles as well as industrial applications, for example stationary power plants and others.

We claim:

1. An internal combustion engine containing a combustion chamber, comprising:

an engine body including an engine cylinder, a cylinder head forming an inner face of the combustion chamber and at least one intake port formed in the cylinder head for directing intake air into the combustion chamber, the intake air undergoing a swirling effect during operation, said swirling effect resulting is a swirl ratio SR in the range of 0.5–2.5;

a piston positioned for reciprocal movement in said engine cylinder between a bottom dead center position and a top dead center position, said piston including a piston crown including a top face facing the combustion chamber, said piston crown containing a piston bowl formed by an outwardly opening cavity, said piston bowl including a projecting portion having a distal end and an inner bowl floor section extending inwardly at an inner bowl floor angle a in the range of 16–40 degrees from a plane perpendicular to an axis of reciprocation of the piston, said piston bowl further including an outwardly flared outer bowl section having a concave curvilinear shape in cross section;

an injector mounted on the engine body adjacent said projecting portion of said piston bowl to inject fuel into the combustion chamber, said injector including a plurality of orifices arranged to form a spray plume, each of said plurality of orifices having a central axis oriented at a spray angle $\beta$ from a plane perpendicular to the axis of reciprocation of the piston sufficient to cause the spray plume to impinge on said inner bowl floor section, said spray angle $\beta$ equal to a value causing the spray angle $\beta$ minus the inner bowl floor angle $\alpha$ to be in the range of 0–19 degrees, each of said plurality of orifices including an outlet opening having a center, said center being a distance $L_1$ from said distal end of said projecting portion, said distance $L_1$ being in the range of 0.5–4 mm.

2. The engine of claim 1, wherein said plurality of orifices are no more than 6 orifices.

3. The engine of claim 1, wherein said inner bowl floor angle $\alpha$ is in the range of 18–30 degrees and said spray angle $\beta$ equals a value causing the spray angle $\beta$ minus the inner bowl floor angle $\alpha$ to be in the range of 0–13 degrees.

4. The engine of claim 1, wherein said swirl ratio is in the range of 0.7–1.5.

5. The engine of claim 1, further including a cylinder head forming an inner face of the combustion chamber, wherein a distance $L_2$ between said center of said outlet opening and said inner face of said cylinder head forming said combustion chamber is in the range of −0.5–3 mm.

6. The engine of claim 1, wherein a distance BH between the top face of the piston crown and said center of said outlet opening is in the range of 0.5–8 mm.

7. The engine of claim 1, wherein said concave curvilinear shape of said outwardly flared outer bowl section has a radius of curvature $R_1$ in the range of 8–20 mm.

8. The engine of claim 1, wherein said engine cylinder has a cylinder diameter CD and said piston bowl has a bowl diameter BD, a BD/CD ratio is in the range of 0.5–0.9.

9. The engine of claim 1, wherein said outwardly flared outer bowl section intersects said top face at an edge having a radius of curvature $R_2$ equal to or less than 1.5 mm.

10. The engine of claim 2, wherein said plurality of orifices are no more than 5 orifices.

11. The engine of claim 1, wherein distance $L_1$ is in the range of 1.5–3 mm.

12. The engine of claim 8, wherein said BD/CD ratio is in the range of 0.75–0.9.

13. The engine of claim 7, wherein $R_1$ is in the range of 12–16.5 mm.

14. The engine of claim 7, wherein $R_1$ includes a center of radius positioned in one of said outwardly opening cavity forming said piston bowl and a plane extending through said top face of said piston perpendicular to the axis of reciprocation of the piston.

15. The engine of claim 2, further including a cylinder head forming an inner face of the combustion chamber, wherein a distance $L_2$ between said center of said outlet opening and said inner face of said cylinder head forming said combustion chamber is in the range of −0.5–3 mm.

16. The engine of claim 15, wherein a distance BH between the top face of the piston crown and said center of said outlet opening is in the range of 0.5–8 mm.

17. The engine of claim 16, wherein said concave curvilinear shape of said outwardly flared outer bowl section has a radius of curvature $R_1$ in the range of 8–20 mm.

18. The engine of claim 17, wherein said engine cylinder has a cylinder diameter CD and said piston bowl has a bowl diameter BD, a BD/CD ratio is in the range of 0.5–0.9.

19. The engine of claim 18, wherein said outwardly flared outer bowl section intersects said top face at an edge having a radius of curvature $R_2$ equal to or less than 1.5 mm.

20. The engine of claim 6, further including a cylinder head forming an inner face of the combustion chamber, wherein a distance $L_2$ between said center of said outlet opening and said inner face of said cylinder head forming said combustion chamber is in the range of −0.5–3 mm.

21. The engine of claim 2, further including a cylinder head forming an inner face of the combustion chamber, wherein a distance $L_2$ between said center of said outlet opening and said inner face of said cylinder head forming said combustion chamber is in the range of −0.5–3 mm.

22. The engine of claim 7, further including a cylinder head forming an inner face of the combustion chamber, wherein a distance $L_2$ between said center of said outlet opening and said inner face of said cylinder head forming said combustion chamber is in the range of −0.5–3 mm.

23. The engine of claim 8, further including a cylinder head forming an inner face of the combustion chamber, wherein a distance $L_2$ between said center of said outlet opening and said inner face of said cylinder head forming said combustion chamber is in the range of −0.5–3 mm.

24. The engine of claim 9, further including a cylinder head forming an inner face of the combustion chamber, wherein a distance $L_2$ between said center of said outlet opening and said inner face of said cylinder head forming said combustion chamber is in the range of −0.5–3 mm.

25. The engine of claim 2, wherein a distance BH between the top face of the piston crown and said center of said outlet opening is in the range of 0.5–8 mm.

26. The engine of claim 4, wherein a distance BH between the top face of the piston crown and said center of said outlet opening is in the range of 0.5–8 mm.

27. The engine of claim 7, wherein a distance BH between the top face of the piston crown and said center of said outlet opening is in the range of 0.5–8 mm.

28. The engine of claim 8, wherein a distance BH between the top face of the piston crown and said center of said outlet opening is in the range of 0.5–8 mm.

29. The engine of claim 9, wherein a distance BH between the top face of the piston crown and said center of said outlet opening is in the range of 0.5–8 mm.

30. The engine of claim 2, wherein said concave curvilinear shape of said outwardly flared outer bowl section has a radius of curvature $R_1$ in the range of 8–20 mm.

31. The engine of claim 4, wherein said concave curvilinear shape of said outwardly flared outer bowl section has a radius of curvature $R_1$ in the range of 8–20 mm.

32. The engine of claim 8, wherein said concave curvilinear shape of said outwardly flared outer bowl section has a radius of curvature $R_1$ in the range of 8–20 mm.

33. The engine of claim 9, wherein said concave curvilinear shape of said outwardly flared outer bowl section has a radius of curvature $R_1$ in the range of 8–20 mm.

34. An internal combustion engine containing a combustion chamber, comprising:
   an engine body including an engine cylinder, a cylinder head forming an inner face of the combustion chamber and at least one intake port formed in the cylinder head for directing intake air into the combustion chamber, the intake air undergoing a swirling effect during operation, said swirling effect resulting is a swirl ratio SR in the range of 0.5–2.5;
   a piston positioned for reciprocal movement in said engine cylinder between a bottom dead center position and a top dead center position, said piston including a piston crown including a top face facing the combustion chamber, said piston crown containing a piston bowl formed by an outwardly opening cavity, said piston bowl including a projecting portion having a distal end and an inner bowl floor section extending inwardly at an inner bowl floor angle $\alpha$ in the range of 16–40 degrees from a plane perpendicular to an axis of reciprocation of the piston, said piston bowl further including an outwardly flared outer bowl section having a concave curvilinear shape in cross section, said concave curvilinear shape of said outwardly flared outer bowl section having a radius of curvature $R_1$ in the range of 8–20 mm;
   an injector mounted on the engine body adjacent said projecting portion of said piston bowl to inject fuel into the combustion chamber, said injector including a plurality of orifices arranged to form a spray plume, each of said plurality of orifices having a central axis oriented at a spray angle $\beta$ from a plane perpendicular to the axis of reciprocation of the piston sufficient to cause the spray plume to impinge on said inner bowl floor section, said spray angle $\beta$ equal to a value causing the spray angle minus the inner bowl floor angle $\alpha$ to be in the range of 0–19 degrees, each of said plurality of orifices including an outlet opening having a center, wherein a distance $L_2$ between said center of said outlet opening and said inner face of said cylinder head forming said combustion chamber is in the range of −0.5–3 mm.

35. The engine of claim 34, wherein said plurality of orifices are less than 6 orifices.

36. The engine of claim 34, wherein said inner bowl floor angle $\alpha$ is in the range of 18–30 degrees and said spray angle equals a value causing the spray angle $\beta$ minus the inner bowl floor angle $\alpha$ to be in the range of 0–13 degrees.

37. The engine of claim 34, wherein said swirl ratio is in the range of 0.7–1.5.

38. The engine of claim 34, wherein a distance BH between the top face of the piston crown and said center of said outlet opening is in the range of 0.5–8 mm.

39. The engine of claim 34, wherein said outwardly flared outer bowl section intersects said top face at an edge having a radius of curvature $R_2$ equal to or less than 1.5 mm.

40. An internal combustion engine containing a combustion chamber, comprising:
   an engine body including an engine cylinder, a cylinder head forming an inner face of the combustion chamber and at least one intake port formed in the cylinder head for directing intake air into the combustion chamber, the intake air undergoing a swirling effect during operation, said swirling effect resulting is a swirl ratio SR in the range of 0.5–2.5;
   a piston positioned for reciprocal movement in said engine cylinder between a bottom dead center position and a top dead center position, said piston including a piston crown including a top face facing the combustion chamber, said piston crown containing a piston bowl formed by an outwardly opening cavity, said piston bowl including a projecting portion having a distal end and an inner bowl floor section extending inwardly at an inner bowl floor angle $\alpha$ in the range of 16–40 degrees from a plane perpendicular to an axis of reciprocation of the piston, said piston bowl further including an outwardly flared outer bowl section having a concave curvilinear shape in cross section, said concave curvilinear shape of said outwardly flared outer bowl section having a radius of curvature $R_1$ in the range of 8–20 mm, said outwardly flared outer bowl section intersecting said top face at an edge having a radius of curvature $R_2$ equal to or less than 1.5 mm;
   an injector mounted on the engine body adjacent said projecting portion of said piston bowl to inject fuel into the combustion chamber, said injector including a plurality of orifices arranged to form a spray plume, each of said plurality of orifices having a central axis oriented at a spray angle $\beta$ from a plane perpendicular to the axis of reciprocation of the piston sufficient to cause the spray plume to impinge on said inner bowl floor section, said spray angle $\beta$ equal to a value causing the spray angle $\beta$ minus the inner bowl floor angle $\alpha$ to be in the range of 0–19 degrees.

41. The engine of claim 40, wherein said plurality of orifices are less than 6 orifices.

42. The engine of claim 40, wherein said inner bowl floor angle $\alpha$ is in the range of 18–30 degrees and said spray angle $\beta$ equals a value causing the spray angle $\beta$ minus the inner bowl floor angle $\alpha$ to be in the range of 0–13 degrees.

43. The engine of claim 40, wherein said swirl ratio is in the range of 0.7–1.5.

44. The engine of claim 40, wherein a distance BH between the top face of the piston crown and said center of said outlet opening is in the range of 0.5–8 mm.

45. The engine of claim 40, wherein said engine cylinder has a cylinder diameter CD and said piston bowl has a bowl diameter BD, a BD/CD ratio is in the range of 0.5–0.9.

46. An internal combustion engine containing a combustion chamber, comprsing:
   an engine body including an engine cylinder, a cylinder head forming an inner face of the combustion chamber and at least one intake port formed in the cylinder head for directing intake air into the combustion chamber, the intake air undergoing a swirling effect during operation, said swirling effect resulting is a swirl ratio SR in the range of 0.7–1.5;
   a piston positioned for reciprocal movement in said engine cylinder between a bottom dead center position and a top dead center position, said piston including a piston crown including a top face facing the combustion chamber, said piston crown containing a piston bowl formed by an outwardly opening cavity, said piston bowl including a projecting portion having a distal end and an inner bowl floor section extending inwardly at an inner bowl floor angle $\alpha$ in the range of 16–40 degrees from a plane perpendicular to an axis of reciprocation of the piston, said piston bowl further including an outwardly flared outer bowl section having a concave curvilinear shape in cross section;

an injector mounted on the engine body adjacent said projecting portion of said piston bowl to inject fuel into the combustion chamber, said injector including a plurality of orifices arranged to form a spray plume, said plurality of orifices being less than 6 orifices, each of said plurality of orifices having a central axis oriented at a spray angle $\beta$ from a plane perpendicular to the axis of reciprocation of the piston sufficient to cause the spray plume to impinge on said inner bowl floor section, said spray angle $\beta$ equal to a value causing the spray angle $\beta$ minus the inner bowl floor angle $\alpha$ to be in the range of 0–19 degrees.

47. The engine of claim 46, wherein each of said plurality of orifices includes an outlet opening having a center, said center being a distance $L_1$ from said distal end of said projecting portion, said distance $L_1$ being in the range of 0.5–4 mm.

48. The engine of claim 46, wherein a distance $L_2$ between said center of said outlet opening and said inner face of said cylinder head forming said combustion chamber is in the range of –0.5–3 mm.

49. The engine of claim 46, wherein a distance BH between the top face of the piston crown and said center of said outlet opening is in the range of 0.5–8 mm.

50. The engine of claim 46, wherein said concave curvilinear shape of said outwardly flared outer bowl section has a radius of curvature $R_1$ in the range of 8–20 mm.

51. The engine of claim 46 wherein said outwardly flared outer bowl section intersects said top face at an edge having a radius of curvature $R_2$ equal to or less than 1.5 mm.

52. An internal combustion engine containing a combustion chamber, comprising:

an engine body including an engine cylinder, a cylinder head forming an inner face of the combustion chamber and at least one intake port formed in the cylinder head for directing intake air into the combustion chamber, the intake air undergoing a swirling effect during operation, said swirling effect resulting is a swirl ratio SR in the range of 0.5–2.5;

a piston positioned for reciprocal movement in said engine cylinder between a bottom dead center position and a top dead center position, said piston including a piston crown including a top face facing the combustion chamber, said piston crown containing a piston bowl formed by an outwardly opening cavity, said piston bowl including a projecting portion having a distal end and an inner bowl floor section extending inwardly at an inner bowl floor angle $\alpha$ in the range of 16–40 degrees from a plane perpendicular to an axis of reciprocation of the piston, said piston bowl further including an outwardly flared outer bowl section having a concave curvilinear shape in cross section;

an injector mounted on the engine body adjacent said projecting portion of said piston bowl to inject fuel into the combustion chamber, said injector including a plurality of orifices arranged to form a spray plume, each of said plurality of orifices having a central axis oriented at a spray angle $\beta$ from a plane perpendicular to the axis of reciprocation of the piston sufficient to cause the spray plume to impinge on said inner bowl floor section, said spray angle $\beta$ equal to a value causing the spray angle $\beta$ minus the inner bowl floor angle $\alpha$ to be in the range of 0–19 degrees, each of said plurality of orifices including an outlet opening having a center, wherein a distance $L_2$ between said center of said outlet opening and said inner face of said cylinder head forming said combustion chamber is in the range of –0.5–3 mm, wherein a distance BH between the top face of the piston crown and said center of said outlet opening is in the range of 0.5–8 mm.

53. The engine of claim 52, wherein said plurality of orifices are less than 6 orifices.

54. The engine of claim 52, wherein said outwardly flared outer bowl section intersects said top face at an edge having a radius of curvature $R_2$ equal to or less than 1.5 mm.

55. An internal combustion engine containing a combustion chamber, comprising:

an engine body including an engine cylinder and a cylinder head forming an inner face of the combustion chamber;

a piston positioned for reciprocal movement in said engine cylinder between a bottom dead center position and a top dead center position, said piston including a piston crown including a top face facing the combustion chamber, said piston crown containing a piston bowl formed by an outwardly opening cavity, said piston bowl including a projecting portion having a distal end and an inner bowl floor section extending inwardly at an inner bowl floor angle $\alpha$ in the range of 16–40 degrees from a plane perpendicular to an axis of reciprocation of the piston, said piston bowl further including an outwardly flared outer bowl section having a concave curvilinear shape in cross section;

an injector mounted on the engine body adjacent said projecting portion of said piston bowl to inject fuel into the combustion chamber, said injector including a plurality of orifices arranged to form a spray plume, each of said plurality of orifices having a central axis oriented at a spray angle $\beta$ from a plane perpendicular to the axis of reciprocation of the piston sufficient to cause the spray plume to impinge on said inner bowl floor section, said spray angle $\beta$ equal to a value causing the spray angle $\beta$ minus the inner bowl floor angle $\alpha$ to be in the range of 0–19 degrees, each of said plurality of orifices including an outlet opening having a center, said center being a distance $L_1$ from said distal end of said projecting portion, said distance $L_1$ being in the range of 0.5–4 mm, wherein a distance $L_2$ between said center of said outlet opening and said inner face of said cylinder head forming said combustion chamber is in the range of –0.5–3 mm, and wherein a distance BH between the top face of the piston crown and said center of said outlet opening is in the range of 0.5–8 mm.

56. The engine of claim 55, wherein said plurality of orifices are less than 6 orifices.

57. The engine of claim 55, further including at least one intake port formed in the cylinder head for directing intake air into the combustion chamber, the intake air undergoing a swirling effect during operation, said swirling effect resulting is a swirl ratio SR in the range of 0.5–2.5.

58. The engine of claim 55, wherein said concave curvilinear shape of said outwardly flared outer bowl section has a radius of curvature $R_1$ in the range of 8–20 mm.

59. The engine of claim 55, wherein said outwardly flared outer bowl section intersects said top face at an edge having a radius of curvature $R_2$ equal to or less than 1.5 mm.

60. An internal combustion engine containing a combustion chamber, comprising:

an engine body including an engine cylinder;

a piston positioned for reciprocal movement in said engine cylinder between a bottom dead center position and a top dead center position, said piston including a piston crown including a top face facing the combustion chamber, said piston crown containing a piston bowl formed by an outwardly opening cavity, said piston bowl including a projecting portion having a distal end and an inner bowl floor section extending inwardly at an inner bowl floor angle $\alpha$ in the range of 16–40 degrees from a plane perpendicular to an axis of reciprocation of the piston, said piston bowl further including an outwardly flared outer bowl section having a concave curvilinear shape in cross section, said concave curvilinear shape of said outwardly flared outer bowl section having a radius of curvature $R_1$ in the range of 8–20 mm;

an injector mounted on the engine body adjacent said projecting portion of said piston bowl to inject fuel into the combustion chamber, said injector including a plurality of orifices arranged to form a spray plume, each of said plurality of orifices having a central axis oriented at a spray angle $\beta$ from a plane perpendicular to the axis of reciprocation of the piston sufficient to cause the spray plume to impinge on said inner bowl floor section, said spray angle $\beta$ equal to a value causing the spray angle $\beta$ minus the inner bowl floor angle $\alpha$ to be in the range of 0–19 degrees, each of said plurality of orifices including an outlet opening having a center, said center being a distance $L_1$ from said distal end of said projecting portion, said distance $L_1$ being in the range of 0.5–4 mm, wherein a distance $L_2$ between said center of said outlet opening and said inner face of said cylinder head forming said combustion chamber is in the range of −0.5–3 mm.

61. An internal combustion engine containing a combustion chamber, comprising:

an engine body including an engine cylinder;

a piston positioned for reciprocal movement in said engine cylinder between a bottom dead center position and a top dead center position, said piston including a piston crown including a top face facing the combustion chamber, said piston crown containing a piston bowl formed by an outwardly opening cavity, said piston bowl including a projecting portion having a distal end and an inner bowl floor section extending inwardly at an inner bowl floor angle $\alpha$ in the range of 16–40 degrees from a plane perpendicular to an axis of reciprocation of the piston, said piston bowl further including an outwardly flared outer bowl section having a concave curvilinear shape in cross section, said concave curvilinear shape of said outwardly flared outer bowl section having a radius of curvature $R_1$ in the range of 8–20 mm, said outwardly flared outer bowl section intersecting said top face at an edge having a radius of curvature $R_2$ equal to or less than 1.5 mm;

an injector mounted on the engine body adjacent said projecting portion of said piston bowl to inject fuel into the combustion chamber, said injector including a plurality of orifices arranged to form a spray plume, each of said plurality of orifices having a central axis oriented at a spray angle $\beta$ from a plane perpendicular to the axis of reciprocation of the piston sufficient to cause the spray plume to impinge on said inner bowl floor section, said spray angle $\beta$ equal to a value causing the spray angle $\beta$ minus the inner bowl floor angle $\alpha$ to be in the range of 0–19 degrees, each of said plurality of orifices including an outlet opening having a center, said center being a distance $L_1$ from said distal end of said projecting portion, said distance $L_1$ being in the range of 0.5–4 mm, wherein a distance BH between the top face of the piston crown and said center of said outlet opening is in the range of 0.5–8 mm.

* * * * *